United States Patent [19]
Bird et al.

[11] Patent Number: 6,049,861
[45] Date of Patent: *Apr. 11, 2000

[54] LOCATING AND SAMPLING OF DATA IN PARALLEL PROCESSING SYSTEMS

[75] Inventors: Colin Leonard Bird, Eastleigh; Graham Derek Wallis, West Wellow, both of United Kingdom

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,402

[22] Filed: Jul. 15, 1997

[30] Foreign Application Priority Data

Jul. 31, 1996 [GB] United Kingdom .................... 9616092

[51] Int. Cl.⁷ ...................................................... G06F 12/00
[52] U.S. Cl. .............................................. 712/28; 712/21
[58] Field of Search .............................. 395/610; 712/21, 712/28; 711/114

[56] References Cited

U.S. PATENT DOCUMENTS

| | | | |
|---|---|---|---|
| 5,408,652 | 4/1995 | Hayashi | 395/600 |
| 5,625,832 | 4/1997 | Ohsawa | 712/28 |
| 5,682,535 | 10/1997 | Knudsen | 395/701 |
| 5,867,649 | 2/1999 | Larson | 395/200.31 |
| 5,920,702 | 7/1999 | Bleidt | 395/200.61 |
| 5,963,212 | 10/1999 | Bakalah | 345/424 |

FOREIGN PATENT DOCUMENTS

| | | |
|---|---|---|
| 0 117 220 | 8/1984 | European Pat. Off. . |
| 0 235 525 | 9/1987 | European Pat. Off. . |
| 0 518 311 | 12/1992 | European Pat. Off. . |
| 1156380 | 6/1969 | United Kingdom . |

*Primary Examiner*—Eric Coleman
*Attorney, Agent, or Firm*—Timothy M. Farrell; David J. Kappos

[57] ABSTRACT

A method is disclosed for reproducible sampling of data items of a dataset which is shared across a plurality of nodes of a parallel data processing system.

In data mining of large databases, segmentation of the database is often necessary either to obtain a summary of the database or prior to an operation such as link analysis. A sample of data records are taken to create an initial segmentation model. The records of this sample and the initial model created from them can be critical to the results of the data mining process, and the initial model may not be reproducible unless the same sampling of data records is repeatable. Reproducible sampling is enabled without polling of all nodes to locate particular records. Parametric control information with a small number of control parameters is generated which describes the particular partitioning of the dataset. The parametric control information enables computing of the location of a data record. The parametric control information may be distributed to each node and enable computing of the location of data records by each node. The invention is applicable to other sampling methods.

14 Claims, 5 Drawing Sheets

LOCATING AND SAMPLING OF DATA IN PARALLEL PROCESSING SYSTEMS

FIELD OF INVENTION

The present invention relates to parallel data processing systems in which data is shared across a number of nodes, and to methods and means for locating data items and for reproducible sampling of data items in such systems.

BACKGROUND

Parallel processing techniques are known, in which a plurality of data processing units are provided and a separate processing unit is assigned, for example, to its own mutually exclusive set of local data items to process. This can greatly reduce the overall processing time as compared with serial processing. The 'nodes' of a parallel processing system are the separate processing units, which each have their own processor and their own storage (or at least access to shared storage). Two models exist for processing data which is shared across a plurality of nodes of a parallel processing system. That is, where a dataset is to be processed in parallel, it is loaded into the storage of the plurality of parallel processing units of the system. In a first one of these models, known as the 'master-slave' model, processing is under the control of a master node, which may have its own share of the data. There is generally no more than one master node. The other nodes are referred to as slaves. In the second model, there is generally no one node which is in control—all nodes are communicating with each other in an 'any-to-any' model. With both of these models, if information is to be extracted from a dataset by selecting data items in a specific sequence and performing operations on the selected data, while ensuring adequate coverage of the data on each of the nodes, then a fast and efficient method is required for locating the required data items.

One possible method of locating specific data items within a dataset which is shared across multiple nodes involves polling of all the individual nodes. A first node (generally a controller node) sends a query to all nodes to determine which has, say, item number 15 of the set of data items. One of the nodes should reply with a confirmation that it has this required item. These inter-node communication steps are repeated for each required data item. However, such communication between the nodes entails both undesirable overheads and delays. Furthermore, associated with such inter-node communication is the necessity for status and error checking plus corrective operations to ensure that any communication failures cannot result in out-of-step processing. This entails a significant additional processing overhead. It is thus desirable to avoid any unnecessary communication between the nodes and so a method and a system are required which are not reliant on polling of individual nodes to determine the location of a required data item.

Although polling has these disadvantages, there is also a significant problem with locating and sampling of data items in a parallel system if polling is not used. Difficulties arise because the locations of data items within a dataset which is shared across a number of nodes are dependent on the number of nodes available (or the number selected from the available nodes) for performance of a particular operation and on the chosen type of data partitioning, both of which may be subject to change. The number of nodes across which the dataset is shared may vary, for example, because a number of nodes which were available when an operation was performed for a first time may be unavailable when the operation is subsequently re-run. The data may also be partitioned in different ways across the nodes according to a data analyst's selection. For example, data items may be striped across a number of nodes or each node may hold a contiguous block of data. The analyst may wish to change the partitioning of the dataset across the nodes when an operation is repeated (for example, because of temporal trends identified when the operation was first performed). Thus, each time a particular operation is repeated by the parallel processing system, data items may be located on different nodes than when the operation was previously performed. This makes locating of a particular data item and reproducible sampling of the dataset without polling of all nodes difficult.

A second alternative which may be considered is to provide a look-up mapping table on each node which identifies the items held there (for example, listing their global item numbers within the dataset as a whole and corresponding local item numbers). A master node or every node of the system can be provided with a full list of which nodes hold which items. This is unacceptable, since for any large size database where data mining is likely to be used the data item location tables will also be very large and will consume far too much of the available storage space. Also, generating the look-up tables entails significant overhead.

If efficient reproducible sampling is to be achieved, then there is a need for methods and systems which enable locating of particular selected data items despite any changes to the partitioning of the data set across a variable number of nodes. No method or system has previously been made available which provides efficient automatic determination by a single node of a parallel processing system of the location of items of a dataset which is shared across the system nodes, which does not involve polling of other nodes and which takes account of changes to the data partitioning.

SUMMARY OF INVENTION

According to a first aspect of the disclosed invention, there is provided a method for determining the locations of selected data items of a dataset which is partitioned across a plurality of the nodes of a parallel data processing system, to the method comprising:

generating parametric control information representative of the arrangement of data items across the plurality of nodes; and, responsive to a selection of data items, determining the locations of the selected data items using the parametric control information.

The invention avoids the necessity for polling of the plurality of nodes to identify which of the nodes has a required data item. The control information is preferably established on each of the nodes, and the determination step performed independently by each node using the control information. Provided that all of the nodes are in possession of control information which describes the particular data partitioning, each node is able to compute the location of any data item from an identifying request for the item (for example, from a request key which is used to identify an absolute number within the dataset taken as a whole). Since the control information enables each node to allow for the current partitioning of the dataset across the nodes, a particular sample of data items can be reproduced despite changes in the partitioning between different performances of an operation.

The invention's use of a number of stored parametric values also avoids any need for large look-up mapping tables to be held in storage at any node.

Accordingly, the invention provides a method of reproducible sampling of data items from a dataset which is partitioned across a plurality of nodes of a parallel data processing system, the method comprising: establishing on each of the nodes parametric control information representative of the arrangement of data items across the nodes; and, responsive to a selection of data items, determining at a node of the system the locations of the selected data items using the parametric control information established on that node.

The control information preferably includes information representative of the number of nodes across which the dataset is partitioned and of the nature of the partitioning.

The control information which is established at each node preferably includes information representative of the overall partition array (i.e. the total number of data items on each node as well as the number of nodes) and of either a number of data items within a stripe on each node, if data items of the dataset are striped across a plurality of nodes, or a contiguous arrangement of data on the nodes if each node holds a contiguous block of data. The control information on a node preferably also includes an identification of which of the plurality of nodes the current node is.

Methods according to the invention preferably include a first step of determining from the control information a provisional node which is the node which would have held a required data item if all of the nodes have data, and a second step of identifying empty data segments or partitions on the nodes up to and including the provisional node and then incrementing by the number of empty data segments to determine the node on which the required data item is located. An empty segment or partition in this context means a node with no data. This ensures that the determination of which node is holding a specific data item allows for empty data segments within the overall partition array of the dataset. A third method step preferably uses the parametric control information to determine which of the data items on the holding node is the required one.

In a further aspect of the invention, there is provided a parallel data processing system including: a plurality of nodes with associated storage, across which a dataset can be partitioned; means for selecting data items from said dataset; means responsive to partitioning of a dataset across the nodes for establishing parametric control information representative of the arrangement of data items across the nodes; and means, responsive to selection of a data item, for determining the location of said selected data item using said established control information. The system preferably includes means for distributing the parametric control information to all nodes, to enable each node to determine data item location without polling between nodes.

BRIEF DESCRIPTION OF DRAWINGS

An embodiment of the invention will now be described in more detail, by way of examples, with reference to the accompanying drawings in which.

DETAILED DESCRIPTION OF PREFERRED EMBODIMENTS

The invention has particular application to the field of data mining and, as implemented in a first embodiment, solves a particular problem which occurs when creating an initial segmentation model from sampled data records of a database and in subsequent parallel segmentation of the database, as will be explained below. A very similar problem arises when sampling data items for parallel computation of radial basis functions in data mining, and this is solved by an implementation of the invention according to a second embodiment.

Data mining is the process of extracting valid, previously unknown but ultimately comprehensible information from databases. Data mining technology is used by businesses to discover hidden patterns in their data that can help them, for example, to understand the purchasing behavior of their key customers, to detect likely credit card or insurance claim fraud, or to predict probable changes in financial markets, as valuable inputs to business decisions. The extracted information can be used to form a prediction or classification model (i.e. using a database's historical data to automatically generate a model that can predict a future behavior or can be used for classifying future data), to identify relations between database records, or to provide a summary of the database(s) being mined.

Figure 1:
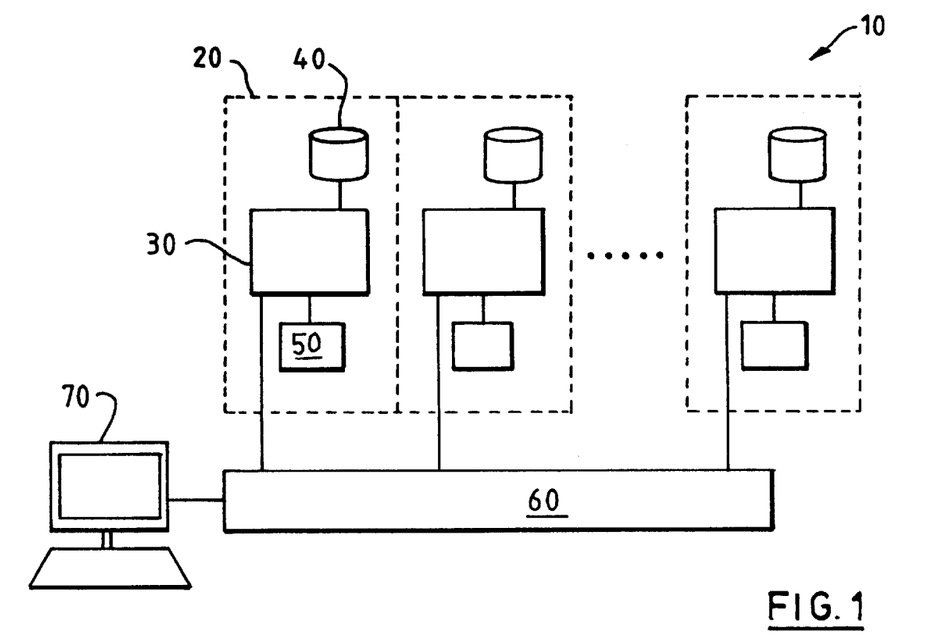
FIG. 1 is a block diagram showing the major components of a parallel data processing system in which the present invention may be implemented.

The invention according to a preferred embodiment is implemented in a data mining framework which can be installed on various computer platforms. As shown in the block diagram of FIG. 1, a parallel data processing system 10 suitable for implementation of the present invention comprises a plurality of data processing units 20 each comprising a processor 30, local disk storage 40, and local memory 50. The independent processing units are each connected to a High Performance Switch (HPS) component 60 which provides communications between the processing units. A controller workstation 70 is connected for user input and results display. One suitable parallel data processing system is IBM Corporation's RISC System/6000 Scalable POWERparallel system, current versions of which support up to 2048 separate processing units. (RISC System/6000, POWERparallel and IBM are trademarks of IBM Corporation).

The data mining framework is a software component which is installed on the system. While a system according to the preferred embodiment of the invention described here in detail comprises a specific combination of hardware and software components, it will be recognized by a person skilled in the art that this is a preferred implementation choice only and is not a limitation of the invention.

A number of data mining operations are provided as selectable processes or components within the data mining framework, for use by a data analyst in 'discovery-driven' data mining (i.e. automatic discovery as opposed to hypothesis testing). The selectable processes or components include a component for creating prediction and classification models, a component for link analysis, a component for database segmentation and a component for deviation detection. Each of these operations is supported by a variety of techniques which are known in the art, implemented within the data mining framework as further selectable software processes. These techniques include use of neural networks, conceptual clustering, and association discovery. Each of the data mining operations provides input to a visualization component of the system.

Information extraction frequently requires cooperative use of several data mining operations and techniques. For example, large databases may be segmented into collections of related records either as a means of obtaining a summary of each database, or before performing a data mining operation such as model creation, or link analysis. To understand the desirability of segmentation, consider the example of a department store which maintains a database in which each record describes the items purchased by one customer during a visit to the store. The database can be segmented based on the records that describe sales during the "back to school" period, records that describe sales during the "after Christmas sale" period, etc. Link analysis can then be performed on those records in the "back to school" segment to identify what items are being bought together during that period, which may give a much clearer picture than if the analysis were performed without segmentation.

Conceptual clustering is used by the segmentation component of the data miner according to the preferred embodiment of the invention to segment a database or dataset into subsets (the clusters) with the members of each cluster sharing a number of properties. A cluster is a smaller and more manageable data set which may be used in subsequent data mining methods, such as in supervised induction. Clusters can be created either statistically or using neural and symbolic unsupervised induction methods, depending largely on the particular type of data. Neural and symbolic methods are distinguished by the type of attribute values they allow the records in the target database to take (e.g. numeric, nominal, structured objects), the way they represent each cluster, and the way they organize the set of clusters (e.g. hierarchically or into flat lists). Once a database has been clustered, an analyst can examine the created clusters to establish the ones that are useful or interesting using a visualization component.

Statistical methods represent a cluster as a collection of instances, assigning a new data record instance to existing clusters or to a new cluster in accordance with a measurement of the distance between the new instance and the instances already in existing clusters. Known neural clustering methods include feature maps and other neural methods implemented in IBM's Neural Network Utility. Known symbolic clustering methods include AQ11, UNIMEM, and COBWEB.

Figure 2:
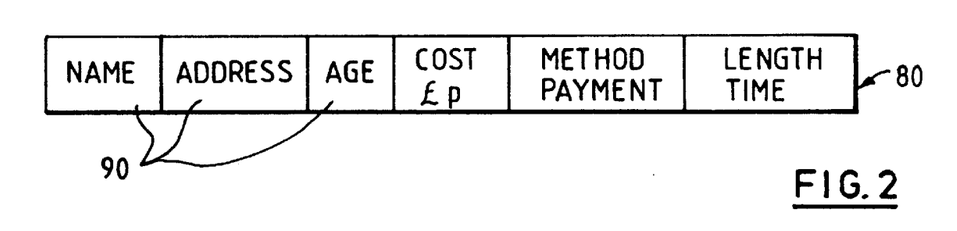
FIG. 2 shows an example data record structure, with a plurality of distinct data attributes within the record.

Let us consider, for example, a data record 80 which has 6 attribute fields 90 as shown in FIG. 2. This record may include data for one customer of an insurance company, including the customer's name, address, age, the cost of their annual insurance premium, their chosen method of payment, and the length of time they have been a customer of the insurance company. A data analyst may wish to segment the database of these records using clustering to discover associations within the data. Perhaps the name of the customer will be disregarded since we can predict that it will have no association with the other data attributes. Thus we have 5 attributes to consider.

The clustering process as implemented by the segmenter component of the data miner is begun by a controller node scanning the full dataset for each of the attributes separately, to establish the distribution (which may be statistical or non-statistical, depending on the type of data) of each attribute for the whole dataset. The controlling node can be any node of the system, for example the first node in the array or the node having the lowest measured current workload. The controlling node could also be a processing unit of a connected workstation. The statistical overview enables a measurement of how close together two different items of data are as compared with the dataset as a whole (for example, with knowledge of the distribution of ages of customers between 17 and 100+, a determination can be made of whether or not age 30 is close to age 35). Clustering of the complete dataset is performed in parallel, after an initial clustering of a dataset sample, as will be explained below.

Figure 3:
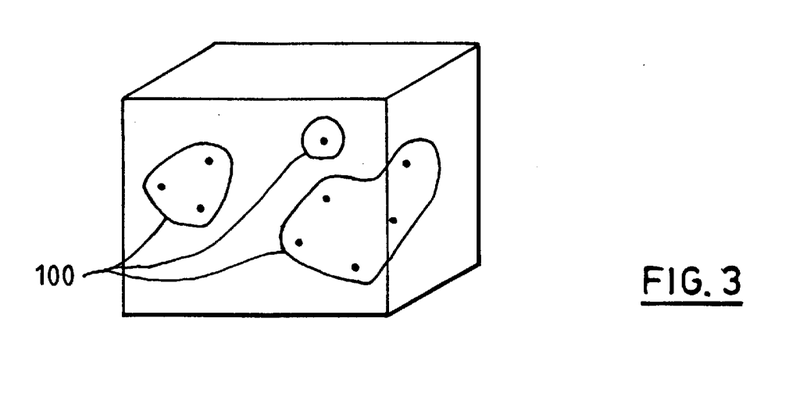
FIG. 3 is a conceptual representation of clustered data items.

For a full understanding of the invention, an overview of the clustering process (which is relevant to both an initial sample clustering and to the subsequent step of segmenting the full dataset) will now be given. A first record is selected from the database and placed in a conceptual 5-dimensional spacemap (a 5-dimensional spacemap since our example data record has 5 data attributes we wish to compare), the position of the record in the spacemap being determined by its data attributes. This first record is in its own cluster. When a second record is selected, it is compared with the first record to decide (with reference to the knowledge of the full dataset and established criteria for making comparisons— using statistical, neural or symbolic techniques) whether it is sufficiently close to the first record to be placed in the same cluster or whether it is too different and should be placed in a different cluster. As each record is considered in turn, either additional records are added to existing clusters or new clusters are created. As records are added, the individual cluster boundaries are 'shifted' or redefined. FIG. 3 is a schematic representation of clustering of data items in a three dimensional space. Three separate clusters 100 are shown. When all of the records to be considered have been placed in clusters as described above (and assuming the data analyst is happy with the clustering), the clusters are used as database segments for analysis or as inputs to further data mining operations. Using our insurance customer example, data records may be clustered according to bands of ages of customers for example.

As mentioned, the clusters shift as the segmentation clustering process continues. The final segmentation may differ according to the order in which data records are considered—the initial clustering of the first, say, 200 data records can be critical to the final segmentation of the database. Clustering is not a mathematically precise technique and does not necessarily produce consistently converging results, since it is sensitive to the order of processing and to redundant and irrelevant features in the data. The user can alleviate the redundant data problem somewhat by directing the clustering process to ignore a subset of the attributes that describe each instance (e.g. ignore names as mentioned above), or by assigning a weight factor to each attribute. Increasing the weight of an attribute increases the likelihood that the clustering process will cluster according to that attribute (the importance of at least numeric-valued attributes being determinable using univariate and bivariate statistical methods if required). Nevertheless, the initial assignment of data records to clusters by the segmenter component will often be very significant to the final results of data analysis (depending on the particular data).

To limit the effects of the order of processing the records, a sample of records is taken and clustering performed serially on the sample by the segmenter to establish an initial segmentation model. For example, sampling every seventh, or thirty seventh, record to create an initial model may reduce the effects on the segmentation of temporal trends within the data as compared with simply processing all items in the order in which they appear in the database.

While an initial sample could in theory be random, a random sampling is not reproducible. With random sampling, each time a segmentation process is run with the same data the randomly sampled records used for generating the initial segmentation model will be different. The initial model may be sufficiently different for the results of segmentation to be different each time. Note that these potential differences do not imply that one set of results is necessarily incorrect (different segmentations may be equally valid), but it does mean that reproducibility is not possible and so meaningful analysis of results may be impossible or far more difficult. For example, the effects of changing the weights of particular attributes may be difficult to determine if the model differs anyway due to a different initial data sample having been taken.

Because of the need for a consistent initial segmentation model, deterministic repeatable data sampling is implemented by the segmenter component of the data miner. In a serial data processing system, there is no difficulty in selecting, say, every seventh record to form a sample. Each time the segmentation process is repeated, the data is in the same order and so the same initial sample is obtained. However, this is not the case where a dataset is partitioned across a plurality of nodes of a parallel data processing system. A sample selection such as "take every seventh record" from such shared data firstly requires locating of those particular records. Performing this operation in a reproducible way is not trivial since the locations of the particular records may be different each time the same dataset is sampled.

Figure 4:
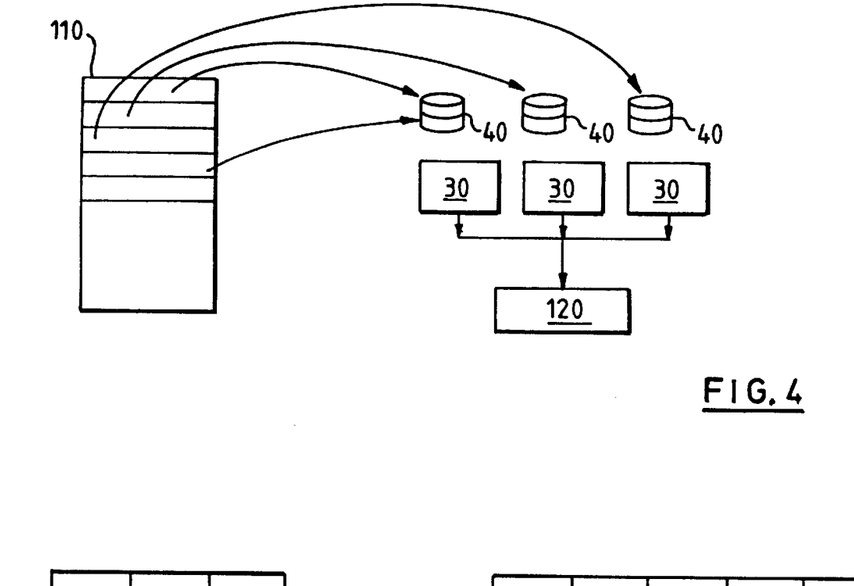
FIG. 4 is a schematic representation of the striped partitioning of data across a plurality of nodes.

As noted above, only a proportion of the total number of nodes of a parallel processing system may be available at a particular time for performing a given task such as segmenting the database. Also, the dataset to be segmented may be partitioned differently at different times even across the same number of nodes. For example, the dataset may initially be shared across a plurality of nodes such that each node has a contiguous block of data. The analyst may then determine that contiguous data partitions lead to an undesirable difference between the partitions because of temporal variations in the data, such that he decides to re-run the clustering of the dataset with the data striped across the nodes. The size of the stripes can be varied (reduced stripe size reduces temporal differences between the data allocated to the different nodes). FIG. 4 shows schematically the striped partitioning of data records across a plurality of nodes of a parallel system. Striped collections of records of the dataset are taken from a database 110 and transferred to local storage 40 of the nodes of the parallel system for processing in parallel. A visualizer component 120 is represented in the diagram as a system component to which each of the separate processing system sends its data for analysis.

Figure 5A:
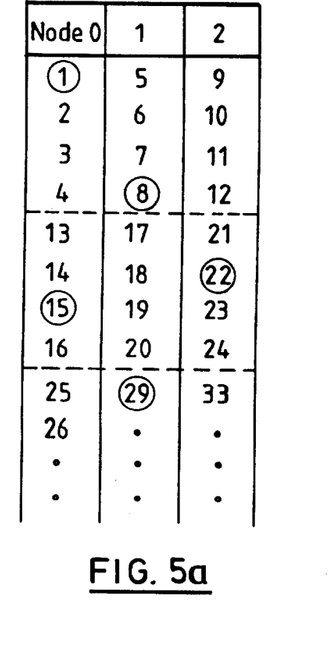
FIGS. 5a and 5b indicate how records of a partitioned dataset may be located across a plurality of nodes, for different numbers of nodes and stripe sizes.
Figure 5B:
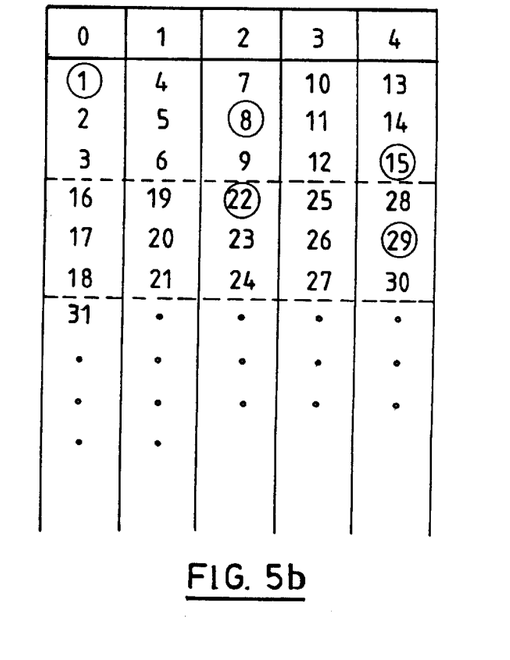

FIGS. 5(a) and 5(b) show by way of example that a different number of nodes across which a dataset is striped and a different stripe size results in the data records being located on different nodes. For the example of selecting every seventh record to form a sample, we can see that the locations of the records to be sampled are very different for the two different partitions (3 nodes and stripe size 4 in FIG. 5(a); 5 nodes and stripe size 3 in FIG. 5(b)).

The parallel segmenter component according to the preferred embodiment of the invention implements a method for repeatable, deterministic sampling of data records which is not reliant on polling of the nodes of the parallel processing system to locate the records to be sampled. Each of the nodes of the system are provided with a small number of control parameter values which enable each node to compute the location of any record from an absolute record number within the dataset taken as a whole.

Figure 6:
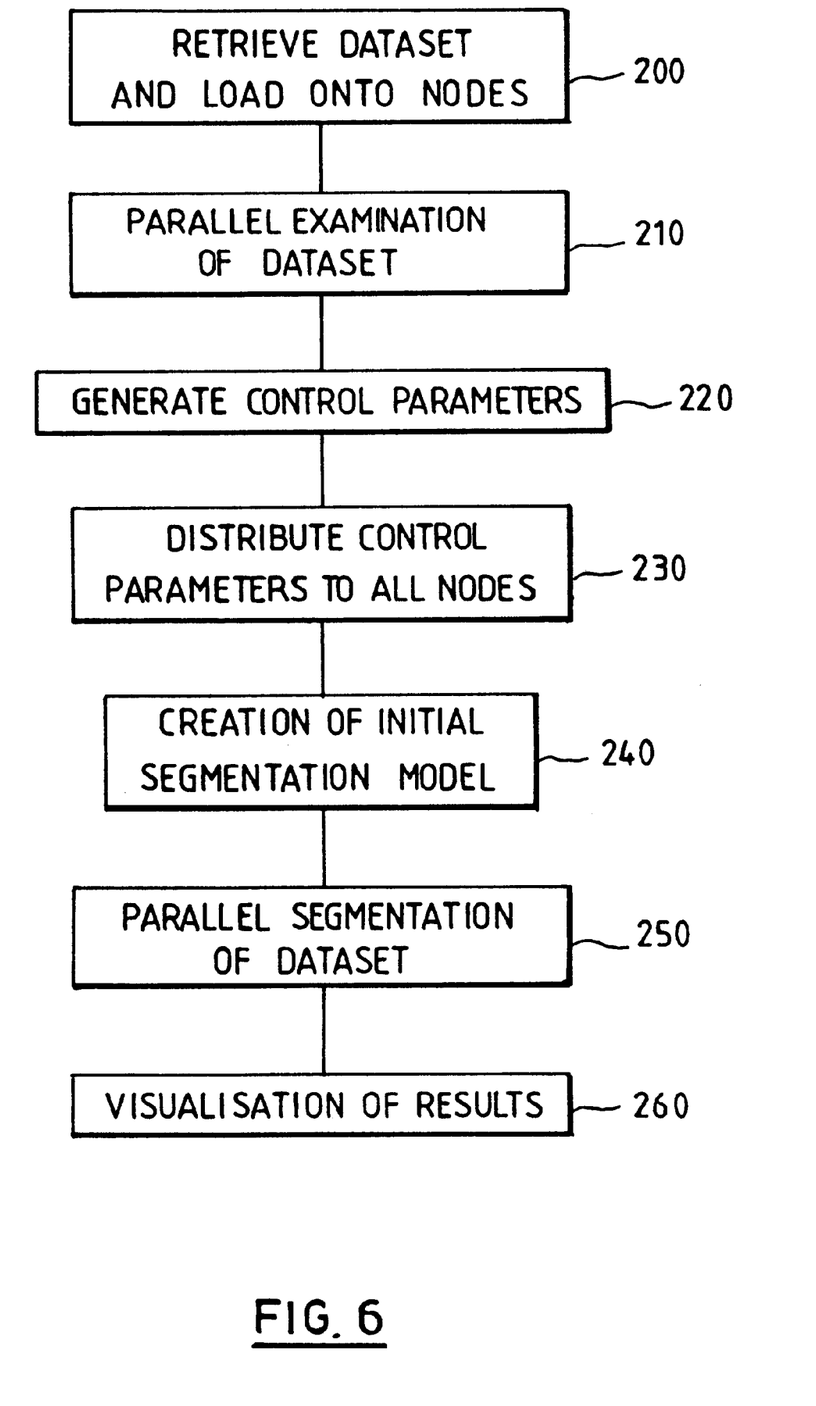
FIG. 6 is a flow diagram of the steps of a method of segmenting a database according to an embodiment of the invention.

When the parallel system retrieves 200 a dataset from a connected database for processing, a controlling node loads the dataset into local storage of the available processing units of the system. A parallel examination 210 of the dataset is generally then performed to determine statistical distributions of data attributes. The data analyst who initiates the data processing operation can specify whether the dataset should be arranged across the individual data processing units in sequential stripes, and the number of data records to be included in each stripe on each node. If the analyst does not specify a particular required partitioning, then the system automatically implements a default partitioning which involves allocating records one at a time to each of the nodes in turn (parameter nStripe=1, as described below). The analyst may also specify the number of nodes to be used which may be a smaller number than the total available.

When loading the dataset into storage, the system automatically generates 220 the following parametric control values:

(i) Partition array—The array has a length equal to the number of nodes which is available for use in the segmentation process, and each element of the array represents the total number of records stored on each node (this number being obtained automatically by the system from an examination of the stored data).

The controlling node which initiated the parallel examination and gathered the results also generates values of the partition array parameter. (In an alternative embodiment, the partition array may be read by the individual nodes from a parameter file before commencing a segmentation process.)

(ii) nStripe—This is a parameter which identifies how the data is partitioned across the nodes. When nStripe=0, each node has contiguous blocks of data; when nStripe>0, the data is striped, as illustrated in FIG. 5(a) for nStripe=4 and FIG. 5(b) for nStripe=3.

(iii) Number of records in band—This is the total number of records in a stripe when taken across all the nodes. As such it is a dependent variable, computed from nStripe and the partition array.

These control values, and an identification of which of the plurality of nodes the current node is, are distributed to 230 and stored at each node of the system. (In some applications of the invention, the controller node may perform the parallel examination 250 of the dataset at this stage—when to perform this determination of data distribution may be mandated by the operation being performed.) Initiated by the controller node, the segmentation process then proceeds in two steps: firstly clustering of a sample of data records to generate 240 an initial segmentation model, and secondly using this model in the parallel segmenting 250 of the full dataset. Computation of record locations within the serial segmenting of a sample of data records from the partitioned dataset will now be described with reference to FIGS. 7 and 8.

Figure 7:
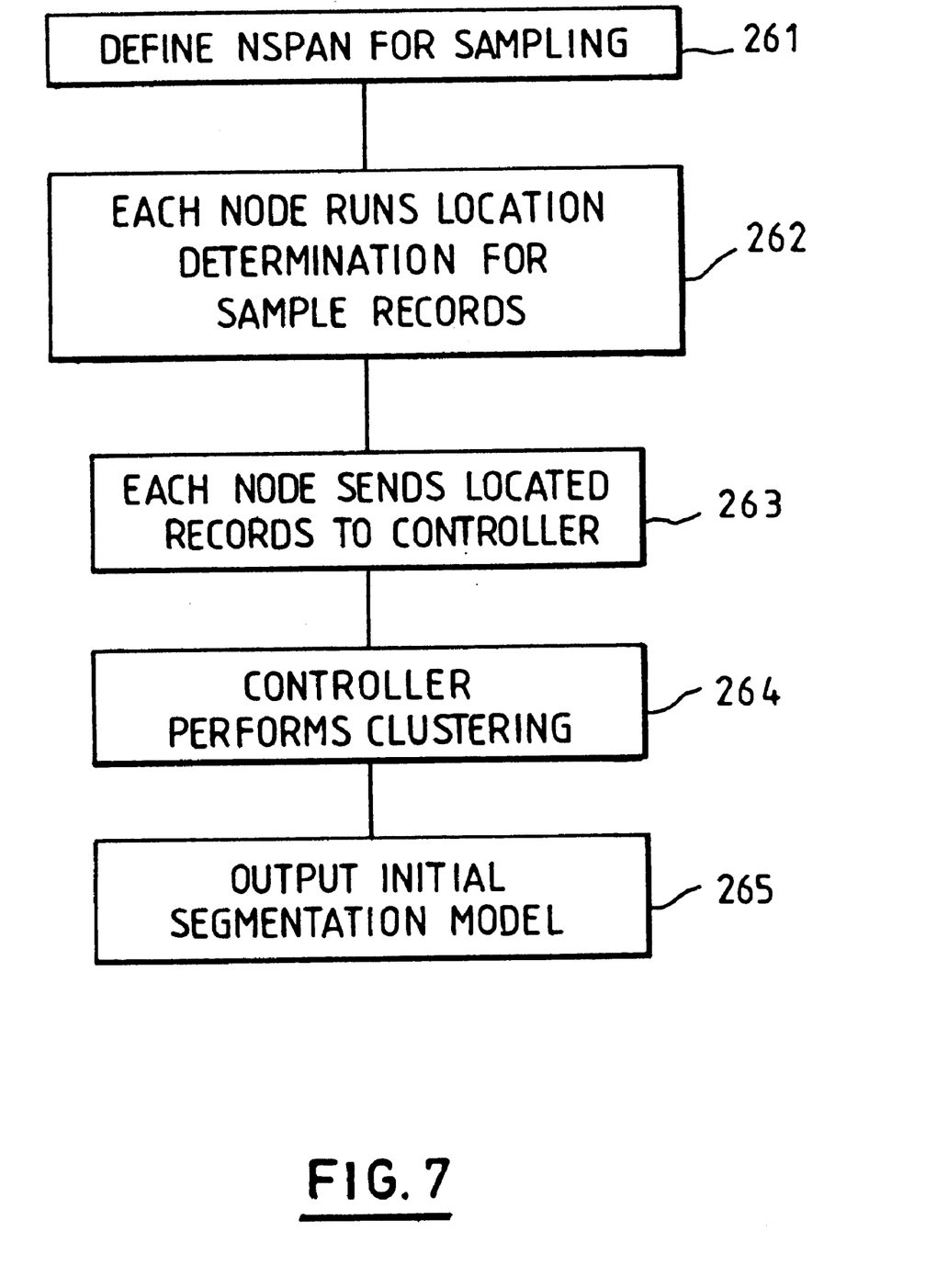
FIG. 7 is a flow diagram of the steps of creating an initial segmentation model according to the embodiment of FIG. 6.

A parameter is defined 261 which determines what selection of data records will provide the sample of data records which will be used to create the initial segmentation model.

This parameter (nSpan) is implemented as a fixed increment, and in particular as a prime number to ensure that data records are taken from all nodes. (The significant point is that the sampling parameter is deterministic—allowing precise identification of the required records—and alternatives to a fixed increment are possible.) Thus, the selection of records according to the preferred embodiment uses the sampling:

required record number=previous record number+nSpan

A first data record is selected—specified by its record number (recordNum) which is a unique number within the dataset, and which is validation checked by the system. Records are numbered from 1 upwards by convention, and the system default is to initially select record 1. Nodes are numbered from 0. Subsequent records are selected for the sample by incrementing by nSpan—i.e. spanning across the dataset.

The sampling of records involves each node running 261 a process to determine which nodes hold the selected records, to identify which of the selected records it holds. Each node then sends 263 its identified records to the controller node for clustering 264 to generate 265 the initial segmentation model. Thus, all nodes other than the controller merely identify and send records to the controller—processing of the sample is performed on a single controller node. The controller node does not have to request each record in turn as the nodes of the system are each independently computing the locations of required records using the spanning parameter and other stored parametric control information.

A record number can be located from any node in the system after the selection parameter nSpan is used to select required records by their record number. That is, with the control values stored on all nodes and the nSpan selection parameter known, the single required argument to the record locating routine is a record number.

Figure 8:
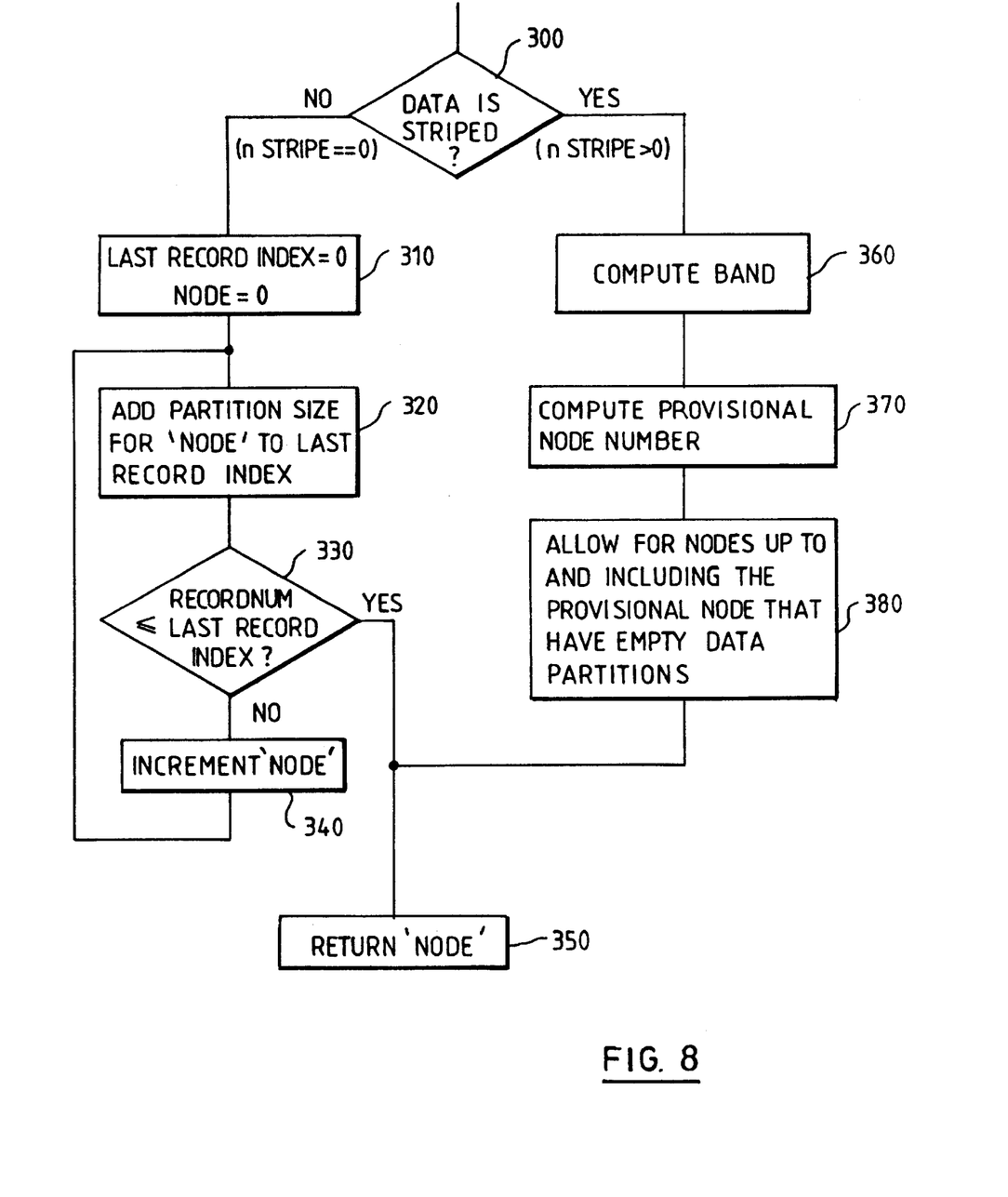
FIG. 8 is a flow diagram showing the steps of a method of locating of a data item according to the embodiment of FIGS. 6 and 7.

Each node runs the following process. Computation depends on whether the data is striped, as determined 300 by the locally held nStripe parameter. If nStripe=0, then we have the case where each node has contiguous blocks of data. The location of a record can then simply be computed from the partition array. Starting with consideration of node 0 (step 310), a determination is made 330 of whether a selected record number is less than or equal to a LastRecordIndex which is the record number of the last record on the given node, as computed 320 from the partition size which is known from the partition array parameter. If the answer is yes, then the node holding the record has been identified 350. If the answer is no, then we carry out the same determination for the next node: the node number is incremented 340 and the partition size of this next node is added 320 to the lastRecordIndex. If the record number in question is less than or equal to the new lastRecordIndex, then the holding node has been identified.

If nStripe>0, then the locating of a selected record is implemented in three steps as shown in FIG. 6: computing 360 the band of records which includes the record in question; computing 370 a 'provisional' node which would hold the record if there are no empty data segments; and incrementing the result 380 to allow for empty data segments.

(i) The band (a stripe taken across all nodes) which contains the selected data record is computed from the specific data record and the known number of records in a band (one of the stored control parameters), using the formula:

band=(recordNum−1)/NumRecsInBand (The band is required to be an integer value—the lowest band being band zero, so the result of the above formula is automatically rounded down to the nearest integer value or zero).

(ii) The provisional node calculation uses the nStripe parameter, according to the formula:

node=((recordNum−1)−(band*NumRecsInBand))/nStripe (The node identifier must be an integer or zero, so we again round down).

(iii) Then the third step makes allowance for empty data segments, by incrementing through the nodes and checking whether the data partition on each node up to and including the provisional node is empty (i.e. the node has no data). For each empty partition which is identified, the computed provisional node is incremented by one, resulting in determination of the actual node holding the record.

Each node has run this process so each node has now identified which of the selected records it holds. A subsequent computation is then performed by each node to identify these selected records from within its set of local records (that is to convert a global record number to a local record number or location). This is determined using the previously stored control information. A 'band-to-band skip value', which equates to the number of records in a band which are not on the current node, is calculated as follows:

BandToBandSkip=NumRecsInBand−nStripe

Referring to FIG. 5(a), that global record number 17 is the next record on node 1 following global record number 8 is determined using the band-to-band skip (12 records are in each band and 4 records within each band are on each node (stripe size 4), so the skip value is 8. Skipping 8 record numbers following record number 8 takes us to record number 17).

Each node, having determined the location of the selected records which are held by it, sends these records to the controller node. The controller has performed the same calculation and so knows which records will be sent to it, which nodes will send which of these records, and also the order in which they will be sent since the computation is performed sequentially by each node. The clustering process is performed serially on the incoming data records by the controller node, as described above.

This serial processing results in a segmented sample of data records, which is a segmentation model for the database as a whole. Further analytical steps can be performed on this segmentation model, but generally the model is used as an input for segmenting the full dataset. That is, the initial segmentation model serves as a starting point which is used by each node for subsequent clustering of its partition of the dataset. The clustering of the full dataset is performed in a series of parallel phases, with each node clustering its own data and then consolidating with the other nodes at the end of each phase to prevent the segmentation models which are being developed by each of the individual nodes from diverging. The consolidation steps involve collation of processed information from all participating nodes (including the controller node if it has local data), merging of this information to form a consistent representation of the current state of the segmentation computation, and redistribution of that current state to all nodes. Further processing then proceeds from a common state. This processing in parallel phases and then consolidating continues until the whole dataset has been processed.

It should be noted that the calculation of which node is holding a record is not dependent on the 'spanning', which generates one type of sample, but can be used for locating selected data records whatever sampling is used. A second embodiment of the invention uses the same determination of which node of a parallel processing system is holding a record when computing radial basis functions.

Radial basis functions take a first set of data records for building a model and then a second set of data records for testing the convergence of that model. For example, blocks of six records may be used in creating the model with blocks of, say, three records between each block of six which are used for testing. (This is sometimes referred to as 'chunking'.) When selecting the blocks of six data records, each of the nodes of the system determines which of its local data records are within the subset of the dataset which is the 'in-sample' (the records to be sampled), using the partition array and the nstripe parameters. Each node locates these records and then processes them. A subsequent step involves the identification of the data records in the 'out-sample'— the records which are to be used in testing the models created from the 'in-sample' records—and testing using these records.

As with the first embodiment described above, use of parametric control information at each node of the system in the determination of which node is holding a particular record enables each node to perform this computation efficiently without polling of all nodes, and to sample the data reproducibly despite variations in the partitioning of the dataset across the parallel processing system.

As will be understood by one of ordinary skill in the art, computer programs such as that described herein are typically either distributed on a computer-readable storage medium, such as a CD-ROM, as an article of manufacture having the computer program embodied therein, or distributed as a computer program product, e.g., electronically, and stored on a storage medium, such as a hard disk drive, as computer-readable program code.

While the preferred embodiment of the present invention has been described in detail, it will be understood that modifications and adaptations to the embodiment may occur to one of skill in the art without departing from the scope of the present invention as set forth in the following claims

We claim:

1. A method for determining the locations of selected data items of a dataset which is shared across a plurality of the nodes of a parallel data processing system where the nodal location of each data item may be determined directly without comunication with all the nodes of the parallel data processing system, the method comprising:

generating parametric control information representative of the arrangement of data items across the plurality of nodes, the parametric control information sufficient to identify, in combination with a selection of data items, the node where each data item resides; and responsive to a selection of data items, determining the locations of the selected data items using the parametric control information.

2. The method according to claim 1, wherein said generating step additionally comprises distributing said parametric control information to said plurality of nodes of the system, enabling any node of said system to compute the node which holds a selected data item from an identification of that data item and said parametric control information held on that node.

3. The method according to claim 2, wherein said determining step additionally comprises each node performing a determination of which of a set of selected data items it holds, using said parametric control information representative of the arrangement of data items and a parameter determinative of data item selection criteria, and said method comprises the additional step of then transmitting the selected data items which it holds to a controller node for processing.

4. The method according to claim 1, wherein said parametric control information includes information representative of the number of nodes across which the data is shared and of the number of data items on each node, and information representative of either a number of data items within a stripe on each node, if data items of the dataset are striped across a plurality of nodes, or of a contiguous arrangement of data on the nodes if each node holds a contiguous block of data.

5. The method according to claim 1, wherein said step of determining the locations of selected data items comprises a step of determining from the control information a provisional node which is determined to be the node which would be holding a selected data item if all of the nodes have data, and a subsequent step of identifying empty data partitions on the nodes up to and including the provisional node and incrementing by the number of empty data partitions to determine the node on which the selected data item is located.

6. The method according to claim 5, wherein said step of determining the locations of selected data items includes identifying the node holding a particular selected data item according to the following steps:

a first step of computing the band in which a selected data item is held, as the result of a division of a global data item number by the number of data items in a band;

a second step of computing the provisional node, as the result of subtracting the product of the number of the band and the number of records in a band from the record number and then dividing by the number of data items in a band on each node; and a third step of incrementing for each empty data partition on any node up to the provisional node.

7. A method of sampling data items of a dataset which is shared across a plurality of nodes of a parallel processing system, including the steps of:

selecting a first parameter determinative of sample selection criteria;

generating parametric control information representative of the arrangement of data items across the plurality of nodes, the parametric control information sufficient to identify, in combination with a selection of data items, the node where each data item resides; and responsive to selection of sample data items in accordance with the first parameter, computing the location of the sample data items using the parametric control information.

8. The method according to claim 7, comprising the additional step of:

distributing said generated control information to said plurality of nodes of the system, and wherein said step of computing comprises performing the location computation at each of said nodes, and, having computed at each node the selected data items which it holds, transmitting said selected data items to a controller node for processing the sample.

9. A parallel data processing system having a plurality of nodes with associated storage, across which a dataset can be shared, and including:

means for selecting data items from said dataset;

means, responsive to sharing of a dataset across said plurality of nodes, for establishing parametric control information representative of the arrangement of data items across the plurality of nodes, the parametric control information sufficient to identify, in combination with a selection of data items, the node where each data item resides; and means, responsive to selection of a data item, for determining the location of said selected data item using said established control information.

10. The parallel data processing system of claim 9, wherein said generating one of said nodes additionally distributes said parametric control information to all of said nodes, and wherein each of said nodes computes, from said parametric control information at said node, the location of a selected data item.

11. An article of manufacture for use in a parallel data processing system for selecting data items from a data set which is shared across a plurality of data processing nodes of said parallel data processing system where the nodal location of each data item may be determined directly without communication with all the nodes of the parallel data processing system, said article of manufacture comprising a computer-readable storage medium having a computer program embodied in said medium which may cause said parallel data processing system to:

generate parametric control information representative of the arrangement of data items of said data set across said plurality of data processing nodes, the parametric control information sufficient to identify, in combination with a selection of data items, the node where each data item resides; and compute, in response to a selection of data items, from said parametric control information, the locations of the selected data items.

12. The article of manufacture of claim 11 wherein said computer program embodied in said medium additionally may cause said parallel data processing system to:

distribute said generated parametric control information to said plurality of data processing nodes, enabling any said node to compute, from an identification of a data item and from said parametric control information held at said node, the node which holds the identified data item.

13. A computer program product for operating a parallel data processing system for selecting data items from a data set which is shared across a plurality of data processing nodes of said parallel data processing system where the nodal location of each data item may be determined directly without communication with all the nodes of the parallel data processing system, said computer program product comprising a storage medium having computer-readable program code embodied in said medium for causing said parallel data processing system to:

generate parametric control information representative of the arrangement of data items of said data set across said plurality of data processing nodes, the parametric control information sufficient to identify, in combination with a selection of data items, the node where each data item resides; and compute, in response to a selection of data items, from said parametric control information, the locations of the selected data items.

14. The computer program product of claim 13 wherein said computer-readable program code additionally may cause said parallel data processing system to:

distribute said generated parametric control information to said plurality of data processing nodes, enabling any said node to compute, from an identification of a data item and from said parametric control information held at said node, the node which holds the identified data item.

* * * * *